US010196308B2

(12) United States Patent
Gupta et al.

(10) Patent No.: US 10,196,308 B2
(45) Date of Patent: Feb. 5, 2019

(54) CEMENTING METHODS AND SYSTEMS EMPLOYING A SMART PLUG

(71) Applicant: Halliburton Energy Services, Inc., Houston, TX (US)

(72) Inventors: Vijay Gupta, Cary, NC (US); Mark Roberson, Raleigh, NC (US); David F. Myers, Cambridge, MA (US); James Lynn Davis, Holly Springs, NC (US); David Dausch, Raleigh, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/552,048

(22) PCT Filed: Mar. 17, 2015

(86) PCT No.: PCT/US2015/020995
§ 371 (c)(1),
(2) Date: Aug. 18, 2017

(87) PCT Pub. No.: WO2016/148701
PCT Pub. Date: Sep. 22, 2016

(65) Prior Publication Data
US 2018/0029938 A1    Feb. 1, 2018

(51) Int. Cl.
*E21B 33/16*    (2006.01)
*C04B 28/02*    (2006.01)
*C09K 8/42*    (2006.01)
*C09K 8/467*    (2006.01)
*C04B 40/00*    (2006.01)
*C04B 40/06*    (2006.01)
*C04B 103/10*   (2006.01)

(52) U.S. Cl.
CPC .......... *C04B 28/02* (2013.01); *C04B 40/0032* (2013.01); *C09K 8/42* (2013.01); *C09K 8/467* (2013.01); *E21B 33/16* (2013.01); *C04B 40/0641* (2013.01); *C04B 2103/10* (2013.01)

(58) Field of Classification Search
CPC ... C04B 28/02; C04B 40/032; C04B 40/0641; C04B 2103/10; E21B 33/16
USPC ........................................................ 166/292
See application file for complete search history.

(56) References Cited

U.S. PATENT DOCUMENTS 5,813,457 A     9/1998  Giroux et al.
6,056,053 A  *  5/2000  Giroux .................... E21B 21/10
                                                       166/155

(Continued)

FOREIGN PATENT DOCUMENTS

WO    2014-003549    1/2014

OTHER PUBLICATIONS

International Search Report and Written Opinion for PCT/US2015/020995 dated Dec. 2, 2015.

*Primary Examiner* — Silvana C Runyan
(74) *Attorney, Agent, or Firm* — Thomas Rooney; Tumey L.L.P.

(57) ABSTRACT

A cementing method includes positioning a bottom plug at a casing shoe, rupturing the bottom plug, signaling when a top plug reaches a target position, and releasing a chemical into a cement slurry below the top plug in response to the signaling. The signal may comprise a mechanical trigger changing its position due to movement of the top plug past the target position.

18 Claims, 6 Drawing Sheets

(56) References Cited

U.S. PATENT DOCUMENTS

| | | | |
|---|---|---|---|
| 6,189,621 B1* | 2/2001 | Vail, III | E21B 23/00 166/241.5 |
| 2004/0045711 A1 | 3/2004 | James et al. | |
| 2011/0042082 A1 | 2/2011 | Schultz et al. | |
| 2014/0251603 A1 | 9/2014 | Raducanu et al. | |
| 2016/0273348 A1* | 9/2016 | Echols, III | E21B 47/09 |

* cited by examiner

CEMENTING METHODS AND SYSTEMS EMPLOYING A SMART PLUG

BACKGROUND

In the oil and gas exploration and production industry, wellbores need to be drilled and completed to enable long-term production. The completion process involves installing a casing or liner (steel pipe) into a wellbore and cementing the casing in place. During cementing operations, a cement slurry is pumped down the interior of the casing to the bottom of the wellbore and into the annulus located between the casing and the wellbore. Before drilling can commence to extend a wellbore, the cement slurry needs to cure or harden. This cement curing time interval is referred to as "waiting on cement" or "WOC" and contributes to increased costs in time and money. The WOC interval is affected by downhole parameters that are difficult to monitor or control from the surface.

BRIEF DESCRIPTION OF THE DRAWINGS

Accordingly, there are disclosed in the drawings and the following description cementing methods and systems.

Figure 1:
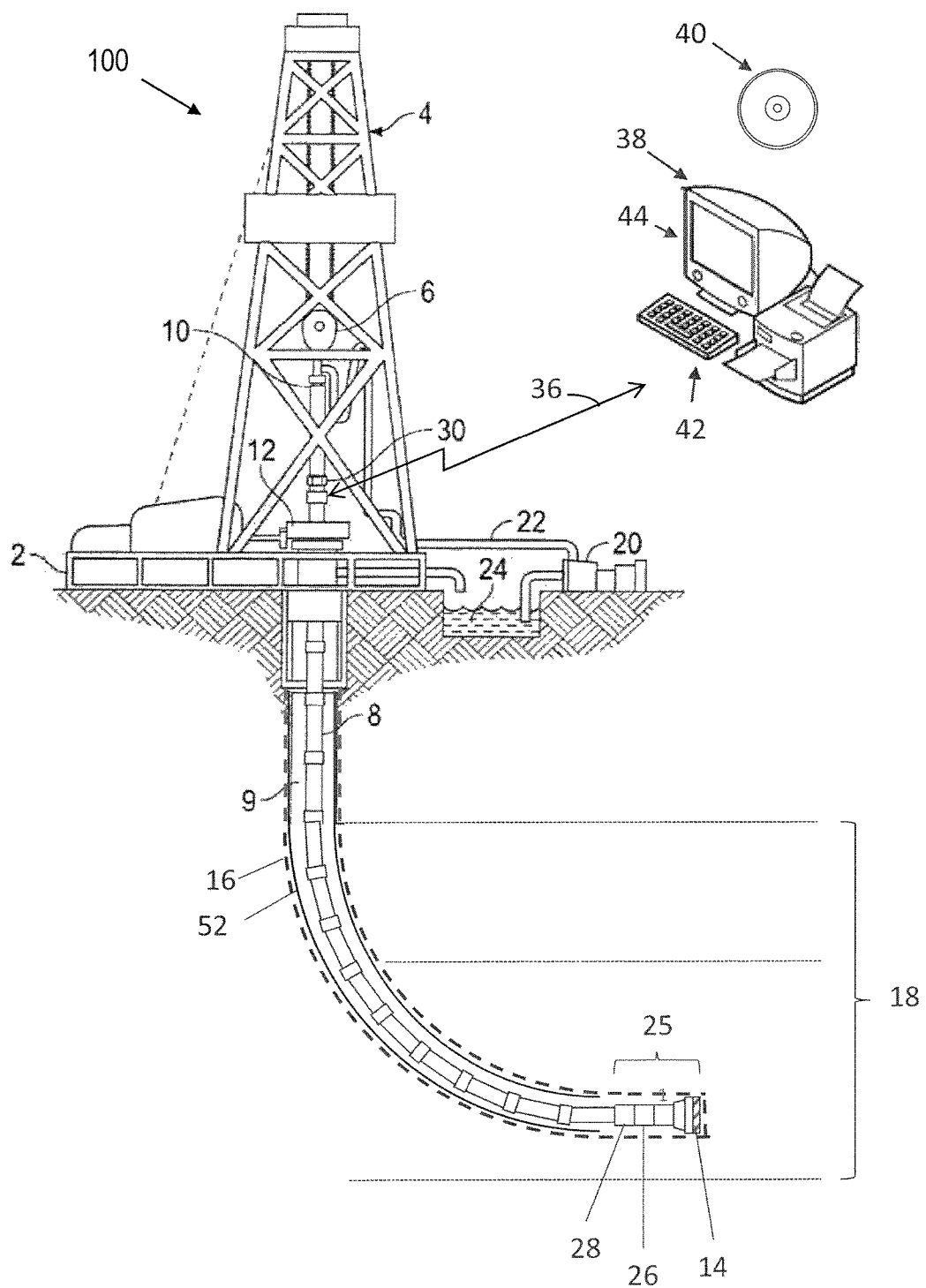
FIG. 1 is a schematic diagram showing an illustrative drilling environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein are cementing methods and systems that employ at least one smart plug. In addition, the disclosed cementing methods and systems may employ a smart casing segment. As used herein, the term "smart" refers to the ability to transmit or receive a signal using electronics. For example, in different embodiments, a top plug and/or a bottom plug may be customized with at least one electronic signaling interface to trigger release of a chemical into a cement slurry depending on the position of the top plug in relation to the position of the bottom plug.

In at least some embodiments, an example cementing method includes positioning a bottom plug at a casing shoe and rupturing the bottom plug. The cementing method also includes signaling when a top plug reaches a target position relative to the bottom plug. The cementing method also includes releasing a chemical into a cement slurry below the top plug in response to the signaling, wherein the signaling or releasing involves an electronic signaling interface included with at least one of the bottom plug and the top plug. Meanwhile, an example cementing system includes a top plug position interface that identifies when a top plug reaches a target position relative to the bottom plug. The cementing system also includes a chemical release interface that releases a chemical into a cement slurry below the top plug in response to a release signal from the top plug position interface. The top plug position interface or the chemical release interface include an electronic signaling interface integrated with at least one of the top plug and a bottom plug. Various signaling interface options, chemical release options, top plug options, bottom plug options, and casing segment options are described herein.

The disclosed methods and systems are best understood when described in an illustrative usage context. FIG. 1 shows an illustrative drilling environment 100 for forming a wellbore 16. In FIG. 1, a drilling platform 2 supports a derrick 4 having a traveling block 6 for raising and lowering a drill string 8. A drill string kelly 10 supports the rest of the drill string 8 as it is lowered through a rotary table 12. The rotary table 12 rotates the drill string 8, thereby turning a drill bit 14. Additionally or alternatively, rotation of the drill bit 14 is controlled using a mud motor or other rotation mechanism (not shown). As the drill bit 14 rotates, it creates the wellbore 16 (represented using dashed lines) that passes through various formations 18. A pump 20 circulates drilling fluid through a feed pipe 22 to the kelly 10, downhole through the interior of drill string 8, through orifices in the drill bit 14, back to the surface via an annulus 9 around the drill string 8, and into a retention pit 24. The pump 20 generates a pressure differential to force a plug or plugs and fluids through a casing 52. The drilling fluid transports cuttings from the wellbore 16 into the retention pit 24 and aids in maintaining the integrity of the wellbore 16.

The drill bit 14 is just one component of a bottom-hole assembly 25 that includes one or more drill collars 26 and logging tool 28. Drill collars 26 are thick-walled steel pipe sections that provide weight and rigidity for the drilling process. The logging tool 28 (which may be built into one of the drill collars) gathers measurements of various drilling or formation parameters. Without limitation, logging tool 28 may be integrated into the bottom-hole assembly 25 near the bit 14 to collect measurements. The collected measurements may be plotted and/or otherwise used for steering the drill string 8, monitoring drilling performance, and/or to analyze formation properties.

Measurements from the logging tool 28 can be acquired by a telemetry sub (e.g., integrated with logging tool 28) to be stored in internal memory and/or communicated to the surface via a communications link. Mud pulse telemetry is one common technique for providing a communications link for transferring logging measurements to a surface receiver 30 and for receiving commands from the surface, but other telemetry techniques can also be used.

The telemetry signals are supplied via a wired or wireless communications link 36 to a computer 38 or some other form of a data processing device. Computer 38 operates in accordance with software (which may be stored on information storage media 40) and user input via an input device 42 to process and decode the received signals. The resulting data may be further analyzed and processed by computer 38 to generate a display of useful information on a computer monitor 44 or some other form of a display device including a tablet computer. For example, an operator could employ this system to obtain and monitor drilling parameters or formation properties.

In the drilling environment 100 of FIG. 1, installation of the casing 52 is represented as having been performed. Installation of the casing 52 involves joining and lowering modular casing segments until a desired casing section length is reached. Once a desired length and position for a particular casing section is achieved, cementing operations are performed, resulting in a permanent casing section installation. As needed, the wellbore 16 is extended by drilling through cured cement at an installed casing section terminus. The process of installing casing sections, cementing the installed casing sections in place, and extending wellbore 16 can be repeated as desired.

Figure 2:
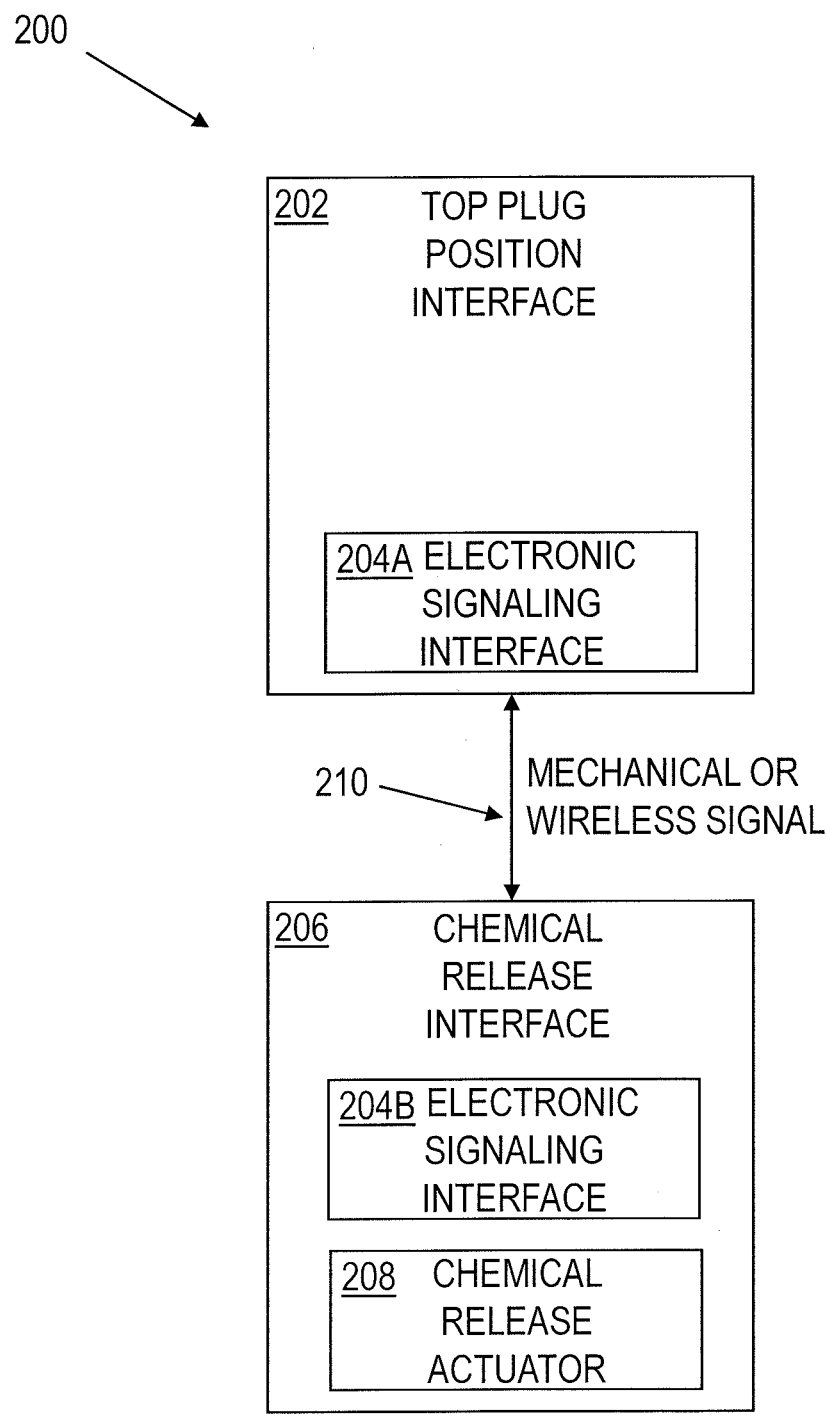
FIG. 2 is a block diagram showing an illustrative cementing system.

FIG. 2 is a block diagram showing an illustrative cementing system 200. As shown, the cementing system 200 includes a top plug position interface 202 and a chemical release interface 206. The components and operations related to the top plug position interface 202 and the chemical release interface 206 may involve signaling between a smart top plug, a smart bottom plug, and/or a smart casing segment as described herein. The signaling between the top plug position interface 202 and the chemical release interface 206 may correspond to a mechanical or wireless signal 210. In either case, the top plug position interface 202 may include an electronic signaling interface 204A while the chemical release interface 206 may include an electronic signaling interface 204B and a chemical release actuator 208.

In at least some embodiments, the electronic signaling interface 204A provides a signal 210 when the top plug (not shown) has reached a target position in relation to a particular casing segment, joint, or terminus (not shown) or in relation to the bottom plug (not shown). The signal 210 is recognized by the signaling interface 204B of the chemical release interface 206, which may then direct the chemical release actuator 208 to release a chemical. The top plug's position in relation to a point along the casing or the bottom plug may be signaled by any of several signaling options, including direct contact with the bottom plug, direct contact with a switch or sensor on the casing wall, use of a magnet and a corresponding sensor, use of a radio frequency electromagnetic field source and a corresponding sensor, use of a radioactive element and a corresponding sensor, use of an acoustic source and a corresponding sensor, use of a timer, or any other signaling option that is a function of proximity and/or time.

In response to signaling between the signaling interfaces 204A and 204B, the chemical release actuator 208 operates to release a chemical catalyst into the interior of the casing segment once a signal is received from the signaling interface 204B. The chemical catalyst may be, but is not limited to, a cement catalyst to reduce the curing time of the cement slurry. In at least some embodiments, the chemical catalyst may be stored in the bottom plug and is isolated from other wellbore fluids until released by the chemical release actuator 208. In an alternative embodiment, a casing segment may include components of the chemical release interface 206.

The cementing system 200 facilitates cementing operations compared to traditional cementing operations that rely on the bottom plug and top plug arriving to their intended position, and then waiting a suitable time for the cement slurry to cure. With the cementing system 200, an operator can deploy a smart top plug, a smart bottom plug, and/or at least one smart casing segment to trigger release of a chemical depending on the position of the top plug. As an example, an operator can select a signaling option for the top plug position interface 202 and the chemical release interface 206 such that the chemical release interface 206 receives signal 210 and releases the chemical when the top plug is 100 feet from its final position, 50 feet from its final position, 20 feet from its final position, 5 feet from its final position, etc. In different embodiments, the released chemical can be released from a top plug, a bottom plug, and/or a casing segment and may mix with the cement slurry slowly or quickly. Further, it should be appreciated that the cementing system 200 can be used independent of downhole monitoring systems that collect measurements during cementing operations, or can be used with such downhole monitoring systems.

Figure 3:
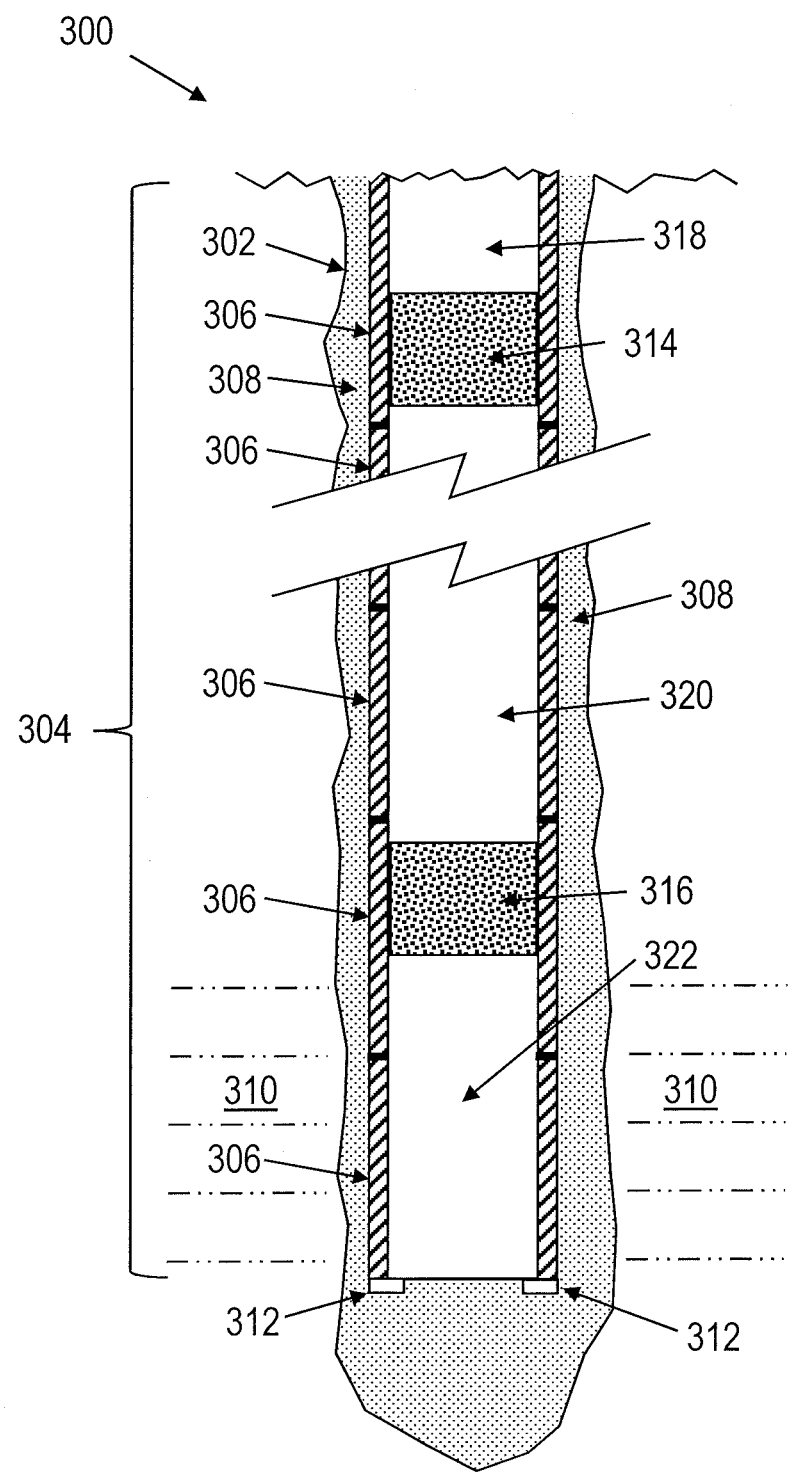
FIG. 3 is a schematic diagram showing an illustrative cementing scenario.

FIG. 3 is a schematic diagram showing an illustrative cementing scenario 300. In cementing scenario 300, a drilled borehole 302 is represented as well as a casing string 304 corresponding to a plurality of casing segments 306 that are connected together, resulting in a single long tubular structure. Each casing segment 306 may correspond to a hollow steel tube about 30 feet long. Located at the bottom of the casing string 304 is a casing shoe 312. Continuing with FIG. 3, the drilled borehole 302 extends into the earth where it penetrates a rock formation 310. The open area between the walls of the drilled borehole 302 and the casing string 304 is called an annulus 308. During drilling operations, the annulus 308 is used to circulate drilling mud. Similarly, during cementing operations, the annulus 308 is at least partially filled with cement slurry (not shown) and left to harden.

In the cementing scenario 300, the bottom plug 316 and the top plug 314 provide separators between cleaning fluid 322, cement slurry 320, and drilling mud 318 (assuming further drilling will be performed after the cement has cured). As pressure is applied from a pump (not shown) at earth's surface, the bottom plug 316 reaches the casing shoe 312 and the cleaning fluid 322 is pushed into the borehole 302 and along the annulus 308. At this point in the process, the bottom plug 316 blocks further forward circulation (reverse circulation is still possible) until the bottom plug 316 is intentionally ruptured by increasing the pressure of any fluids above the bottom plug 316. Once the bottom plug 316 is ruptured, the cement slurry 320 can be pushed into the borehole 302 and along at least part of the annulus 308 until the top plug 314 reaches the casing shoe 312 or bottom plug 316. Once the top plug 314 reaches the casing shoe 312 or bottom plug 316, the cement slurry 320 in the borehole 302 and along the annulus 308 is given time to cure before additional drilling operations are initiated.

In different embodiments, the top plug 314, bottom plug 316, and/or the casing segments 306 may be used to deploy components of the cementing system 200 described for FIG. 2. As an example, the top plug 314 may include components of the top plug position interface 202 and/or the chemical release interface 206. Likewise, the casing segments 306 may include components of the top plug position interface 202 and/or the chemical release interface 206. Further, the bottom plug 316 may include components of the top plug position interface 202 and/or the chemical release interface 206. Many combinations are possible and are limited only by the particular signaling option to be used.

Figure 4A:
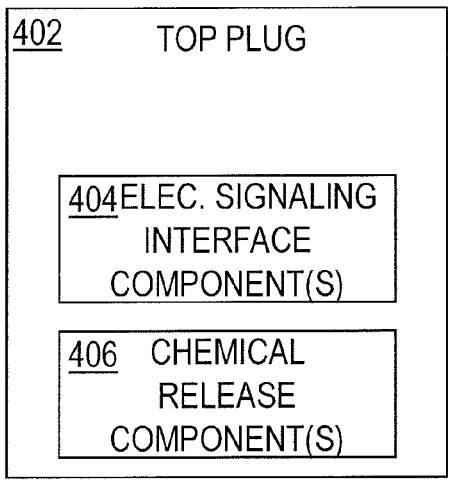
FIGS. 4A, 4B, and 4C are views showing an illustrative top plug, bottom plug, and casing segment, respectfully.
Figure 4B:
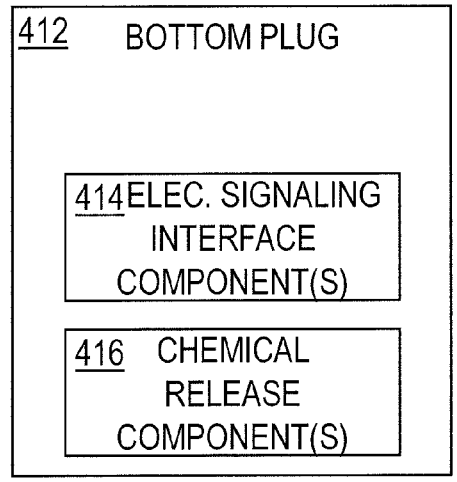
Figure 4C:
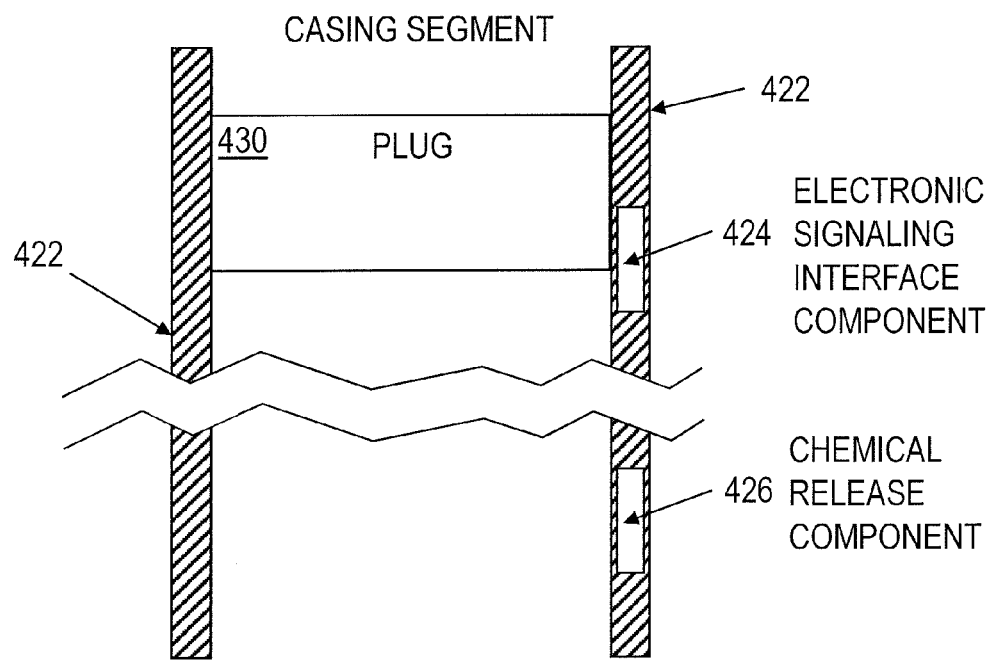

FIGS. 4A, 4B, and 4C are views showing an illustrative top plug, bottom plug, and casing segment, respectfully. FIG. 4A shows a top plug 402 with electronic signaling interface component(s) 404 and chemical release component(s) 406 to perform signaling depending on the position of the top plug and/or to release chemicals as described herein. In alternative embodiments, the electronic signaling interface component(s) 404 and/or the chemical release component(s) 406 may be omitted from the top plug 402 (e.g., if a smart bottom plug and/or smart casing segment is used). FIG. 4B shows a bottom plug 412 with electronic signaling interface component(s) 414 and chemical release component(s) 416 to perform signaling depending on the position of the top plug and/or to release chemicals as described herein. In alternative embodiments, the signaling interface component(s) 414 and/or the chemical release component(s) 416 may be omitted from the bottom plug 412 (e.g., if a smart top plug and/or smart casing segment is used). FIG. 4C shows a cross-sectional view of a casing segment 422 with electronic signaling interface component(s) 424 and chemical release component(s) 426 to perform signaling depending on the position of the top plug and/or to release chemicals as described herein. A plug 430 is also represented in FIG. 4C. The plug 430 may either be a top plug 402 or a bottom plug 412. In alternative embodiments, the signaling interface component(s) 424 and/or the chemical release component(s) 426 may be omitted from the casing segment 422 (e.g., if a smart top plug and/or smart bottom plug is used).

In the embodiments described in FIGS. 4A, 4B, and 4C, electronic signaling interface component(s) 404, 414, and 424 may employ technology based on magnets and magnetic sensors, electrical switches and electronic sensors, transducers, electromagnetic technology, fiber optic cables and sensors, or other proximity detection equipment, either passive or active. The electronic signaling interface component(s) 404, 414, and/or 424 may be deployed in any of several configurations to enable signaling between the top plug 402 and the bottom plug 412, signaling between the top plug 402 and the casing segment 422, and signaling between the casing segment 422 and the bottom plug 412. These options may be used independently or together. In addition to sending or receiving signals to identify proximity of a top plug to a target position, at least some of the electronic signaling interface component(s) 404, 414, and/or 424 operate to trigger a response such as releasing chemicals as described herein. In other words, at least some of the electronic signaling interface component(s) 404, 414, and/or 424 communicate with chemical release component(s) 406, 416, and/or 426 in response to receiving a signal. The chemical release component(s) 406, 416, and/or 426 may be deployed, and chemicals released, in any of several configurations, including in the top plug 402, the bottom plug 412, and/or the casing segment 422. These options may be applied independently or together.

Figure 5:
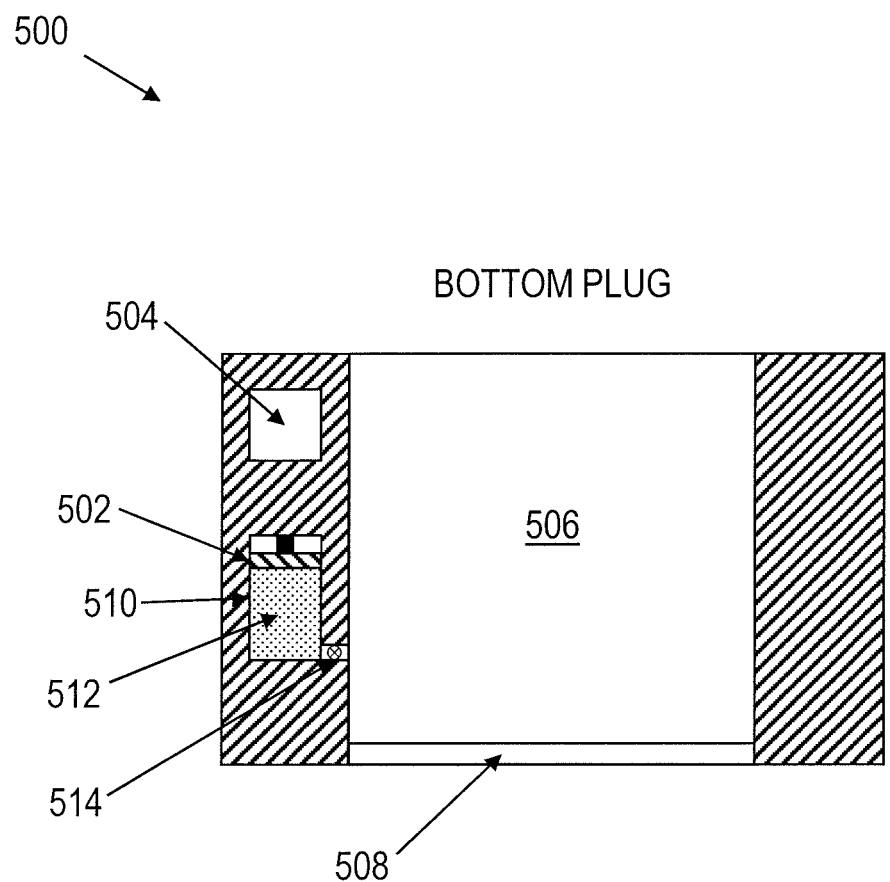
FIG. 5 is a cross-sectional view showing an illustrative bottom plug.

FIG. 5 is a cross-sectional view showing an illustrative bottom plug 500. The bottom plug 500 includes a chemical release actuator 502, an electronic signaling interface 504, a hollow center region 506, a breakable cover 508, a chemical reservoir 510, a quantity of chemical catalyst 512, and a valve 514. The bottom plug 500 is designed to fit snugly into the interior of the casing segment 316 (of FIG. 3) to maintain isolation between two different fluids located both above and below the breakable cover 508. The breakable cover 508 is designed to maintain its shape and integrity while the bottom plug 500 travels down the wellbore but is designed to break apart when the bottom plug 500 stops when it makes contact with the casing shoe 312 (of FIG. 3). In this manner, the breakable cover 508 isolates a cement slurry from other fluids present in a wellbore as the bottom plug 500 travels down a wellbore until the bottom plug 500 reaches a position in contact with the casing shoe 312 (of FIG. 3).

Other embodiments of the bottom plug 500 may include options for allowing the cement slurry to pass through the bottom plug 500 once it reaches the casing shoe 312 (of FIG. 3). These options include using the bottom plug 500 that is broken up in its entirety once the bottom plug 500 reaches the casing shoe 312 (of FIG. 3), or employing a controllable valve (not shown) on the bottom plug 500 that opens once the bottom plug 500 reaches the casing shoe 312 (of FIG. 3).

Another embodiment includes making the bottom plug 500 frangible due to a set pressure threshold or to exposure to particular fluids. Other embodiments are possible.

Once the breakable cover 508 is broken, cement slurry flows through the hollow center region 506 as the pump 20 (of FIG. 1) maintains pressure on the wellbore fluids. At the point where the top plug 402 (of FIG. 4A) reaches a predetermined position relative to the bottom plug 500, a signal is sent from the top plug 402 (of FIG. 4A) to the bottom plug 500. This signal is received by the electronic signaling interface 504 which immediately (or after a period of time) activates the chemical release actuator 502 and signals the valve 514 to open, allowing fluid communication between the chemical reservoir 510 and the hollow center region 506 where the cement slurry is flowing through. Once activated, the chemical release actuator 502 injects the chemical catalyst into the cement slurry, where the catalyst intermixes with the cement slurry and is distributed, intermixed with the cement, into the annulus 308 (of FIG. 3).

Figure 6:
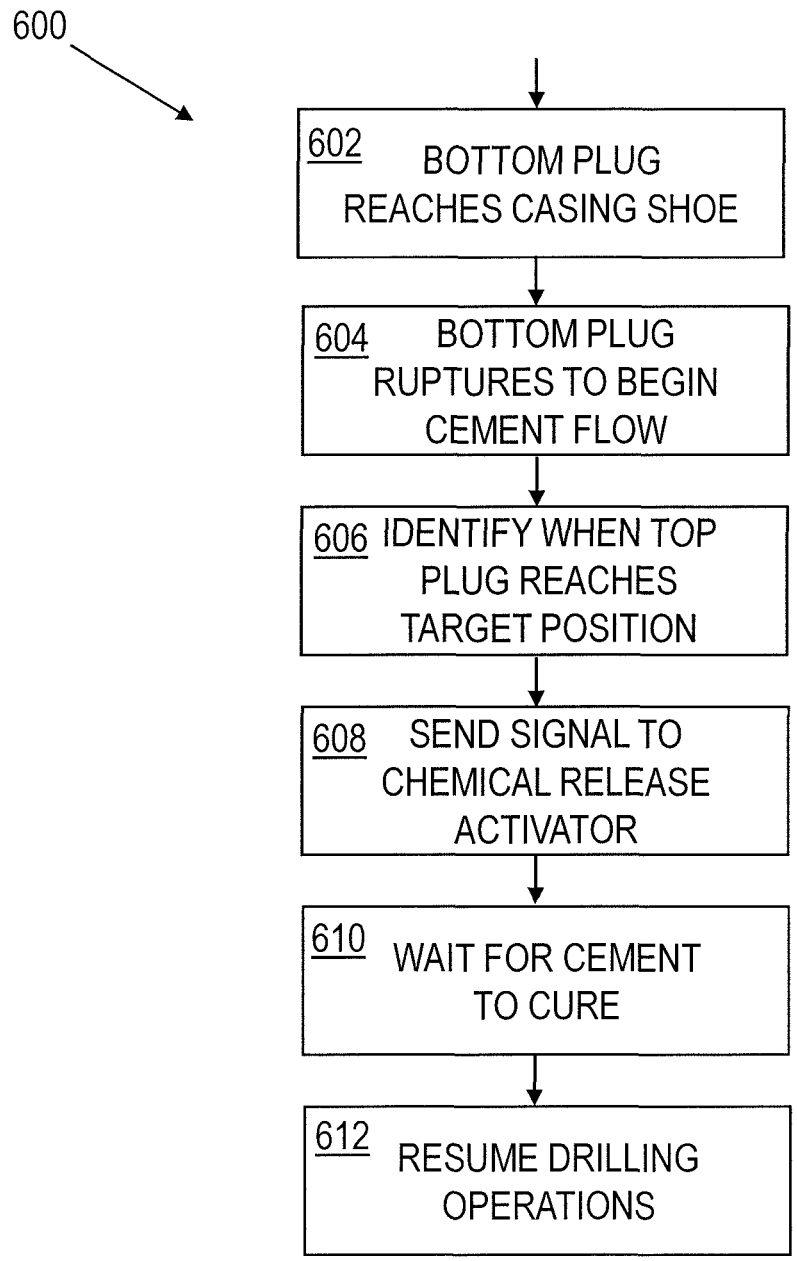
FIG. 6 is a flow chart showing an illustrative cementing method.

FIG. 6 is a flow chart showing an illustrative cementing method. The diagram describes one preferred embodiment but other embodiments are possible. The cementing method includes first installing the bottom plug into the casing string filled with drilling mud or cleaning fluid, inserting the cement slurry, and then installing the top plug. As additional drilling fluids are pumped into the casing string above the top plug, the bottom plug, cement slurry, and top plug are all pushed downward into the casing string towards the casing shoe.

In block 602, the bottom plug reaches the bottom of the casing string and contacts the casing shoe. The bottom plug will then stop moving. In block 604, since the column of materials above the bottom plug, including the cement slurry, top plug, and fluid are still in motion, the bottom plug will rupture, allowing the cement slurry to flow through the bottom plug and into the annulus of the wellbore. Cement slurry will continue to flow into the annulus as the cement slurry and top plug continue their movement towards the casing shoe. At block 606, the top plug will reach a predetermined position along the casing string. This position may be a set distance from the bottom plug. Once the top plug reaches this position, a signal is generated indicating that the top plug has reached the desired position. At block 608, the bottom plug receives the signal from the top plug indicating that the top plug has reached its desired position. In response to the received signal, chemicals are released into the cement slurry flow to accelerate the cement curing time. In this manner, the catalyst is distributed in the cement slurry as the cement slurry travels around the casing shoe and into the annulus. At block 610, there is a waiting period to give time for the cement slurry to cure before the next step in drilling operations can begin. The curing time is reduced since the chemical catalyst has been injected into the cement slurry. Only the lowest 50-100 feet of cement needs to cure before drilling operations may resume. At block 612, the end of the waiting period has passed, the cement slurry has hardened or cured, and additional drilling operations may commence.

Embodiments disclosed herein include:

A: A cementing method comprises positioning a bottom plug at a casing shoe, rupturing the bottom plug, signaling when a top plug reaches a target position relative to the bottom plug, and releasing a chemical into a cement slurry below said top plug in response to said signaling, wherein said signaling or said releasing involves an electronic signaling interface included with at least one of the bottom plug and the top plug.

B: A cementing system comprises a top plug position interface that identifies when a top plug reaches a target position relative to a bottom plug and a chemical release interface that releases a chemical into a cement slurry below said top plug in response to a release signal from the top plug position interface. The top plug position interface or the chemical release interface includes an electronic signaling interface integrated with at least one of the top plug and a bottom plug.

Each of embodiments A and B may have one or more of the following additional elements in any combination: Element 1: wherein said signaling comprising conveying an electromagnetic or acoustic signal between the bottom plug and the top plug. Element 2: wherein said signaling comprising conveying an electromagnetic or acoustic signal between the top plug and a casing segment. Element 3: wherein said signaling comprising conveying an electromagnetic or acoustic signal between a casing segment and the bottom plug. Element 4: wherein said signaling involves using at least one mechanical switch integrated with a casing segment to mark when the top plug reaches the target position. Element 5: wherein said signaling involves using at least one wireless signal interface integrated with a casing segment to mark when the top plug reaches the target position. Element 6: wherein said releasing is performed by the bottom plug in response to a signal received from the top plug or a casing segment. Element 7: wherein said releasing comprises an actuator opening a passage in the bottom plug or forcing the chemical out of the passage to expose the cement slurry to the chemical. Element 8: wherein said releasing is performed by a casing segment or the casing shoe in response to a signal emitted by the bottom plug or the top plug. Element 9: wherein said releasing is performed by a casing segment or a casing shoe in response to a mechanical trigger changing its position due to movement of the top plug past the target position. Element 10: wherein the top plug comprises an electronic signaling interface configured to transmit a proximity signal to a casing segment or the bottom plug. Element 11: wherein the electronic signaling interface includes an acoustic transducer. Element 12: wherein the top plug position interface comprises a proximity sensor integrated with a casing segment. Element 13: wherein the proximity sensor comprises a mechanical switch configured to mark when the top plug reaches the target location. Element 14: wherein the proximity sensor comprises a wireless signal interface configured to mark when the top plug reaches the target location. Element 15: wherein the top plug position interface comprises electronic signaling interfaces integrated with both the top plug and the bottom plug. Element 16: wherein the bottom plug comprises an electronic signaling interface configured to receive the release signal from the top plug or a casing segment, and wherein the bottom plug further comprises an actuator that exposes the cement slurry to the chemical. Element 17: wherein the chemical release interface comprises a chemical reservoir integrated with a casing segment or casing shoe. Element 18: wherein the chemical is a liquid, paste, or solid that accelerates a curing time for the cement slurry.

What is claimed is:

1. A cementing method, comprising:
   positioning a bottom plug at a casing shoe;
   rupturing the bottom plug;
   signaling when a top plug reaches a target position relative to the bottom plug; and
   releasing a chemical into a cement slurry below said top plug in response to said signaling, wherein said signaling or said releasing involves an electronic signaling interface included with at least one of the bottom plug and the top plug, and wherein said releasing is performed by a casing segment or a casing shoe in response to a mechanical trigger changing its position due to movement of the top plug past the target position.

2. The cementing method of claim 1, wherein said signaling comprising conveying an electromagnetic or acoustic signal between the bottom plug and the top plug.

3. The cementing method of claim 1, wherein said signaling comprising conveying an electromagnetic or acoustic signal between the top plug and a casing segment.

4. The cementing method of claim 1, wherein said signaling comprising conveying an electromagnetic or acoustic signal between a casing segment and the bottom plug.

5. The cementing method of claim 1, wherein said signaling involves using at least one mechanical switch integrated with a casing segment to mark when the top plug reaches the target position.

6. The cementing method of claim 1, wherein said signaling involves using at least one wireless signal interface integrated with a casing segment to mark when the top plug reaches the target position.

7. The cementing method of claim 1, wherein said releasing is performed by the bottom plug in response to a signal received from the top plug or a casing segment.

8. The cementing method of claim 7, wherein said releasing comprises an actuator opening a passage in the bottom plug or forcing the chemical out of the passage to expose the cement slurry to the chemical.

9. The cementing method of claim 1, wherein said releasing is performed by a casing segment or the casing shoe in response to a signal emitted by the bottom plug or the top plug.

10. A cementing system, comprising:
    a top plug position interface that identifies when a top plug reaches a target position relative to a bottom plug; and
    a chemical release interface that releases a chemical into a cement slurry below said top plug in response to a release signal from the top plug position interface, wherein the top plug position interface or the chemical release interface includes an electronic signaling interface integrated with at least one of the top plug and a bottom plug, wherein the top plug position interface comprises a proximity sensor integrated with a casing segment, and wherein the proximity sensor comprises a mechanical switch configured to mark when the top plug reaches the target location.

11. The cementing system of claim 10, wherein the top plug comprises an electronic signaling interface configured to transmit a proximity signal to a casing segment or the bottom plug.

12. The cementing system of claim 10, wherein the electronic signaling interface includes an acoustic transducer.

13. The cementing system of claim 10, wherein the proximity sensor further comprises a wireless signal interface configured to mark when the top plug reaches the target location.

14. The cementing system of claim 10, wherein the top plug position interface comprises electronic signaling interfaces integrated with both the top plug and the bottom plug.

15. The cementing system of claim 10, wherein the bottom plug comprises an electronic signaling interface configured to receive the release signal from the top plug or a casing segment, and wherein the bottom plug further comprises an actuator that exposes the cement slurry to the chemical.

16. The cementing system of claim 10, wherein the chemical release interface comprises a chemical reservoir integrated with a casing segment or casing shoe.

17. The cementing system of claim 10, wherein the chemical is a liquid, paste, or solid that accelerates a curing time for the cement slurry.

18. A cementing method, comprising:
   signaling when a top plug reaches a target position relative to a position in a wellbore; and
   releasing a chemical into a cement slurry below said top plug in response to said signaling, wherein said signaling or said releasing involves an electronic signaling interface included with the top plug, and wherein said releasing is performed by a casing segment or a casing shoe in response to a mechanical trigger changing its position due to movement of the top plug past the target position.

\* \* \* \* \*